United States Patent

Scheublein et al.

[15] 3,658,312
[45] Apr. 25, 1972

[54] VEHICLE TORSION SPRING SUSPENSION ASSEMBLY

[72] Inventors: William A. Scheublein, Ballwin; Louis P. Fister, St. Louis, both of Mo.; Lawrence H. Fitch, Cahokia, Ill.; George K. Jeney, St. Louis, Mo.

[73] Assignee: Moog Industries, Inc., St. Louis, Mo.

[22] Filed: Apr. 13, 1970

[21] Appl. No.: 27,916

[52] U.S. Cl................................267/57, 267/26, 267/27, 267/54
[51] Int. Cl......................................B60g 5/00, B60g 11/20
[58] Field of Search....................267/19, 20, 25, 26, 27, 52, 267/54, 57, 56, 58; 280/124 B

[56] References Cited

UNITED STATES PATENTS

| | | | |
|---|---|---|---|
| 1,400,253 | 12/1921 | Wicker | 267/155 |
| 3,484,118 | 12/1969 | Willetts | 267/27 |
| 3,031,179 | 4/1962 | Peirce | 267/56 |
| 1,109,546 | 9/1914 | Raab | 267/26 |
| 1,621,532 | 3/1927 | Gates | 267/26 |
| 830,810 | 9/1906 | Thomas | 267/26 |

Primary Examiner—Drayton E. Hoffman
Attorney—Gravely, Lieder & Woodruff

[57] ABSTRACT

A torsion spring suspension assembly for vehicle frames having load supporting arms rated to the load capacity desired in which the torsion spring is formed with a cantilever arm section and a coil section provided with a coil section bushing of predetermined material, hardness, and configuration to impart to the coil section substantially the same stress as the cantilever section has at the zone where it meets with the coil section, thereby overcoming the usual disadvantages of the normally different stresses in the torsion spring and improving the load carrying capacity of the suspension system without wasting spring material or without stressing either the coil or cantilever sections beyond the design strength characteristics. The torsion spring in the suspension assembly is mounted between the axle and the frame such that the cantilever arm sections are connected to the frame to carry the load and accommodate elongation during spring flexing.

8 Claims, 13 Drawing Figures

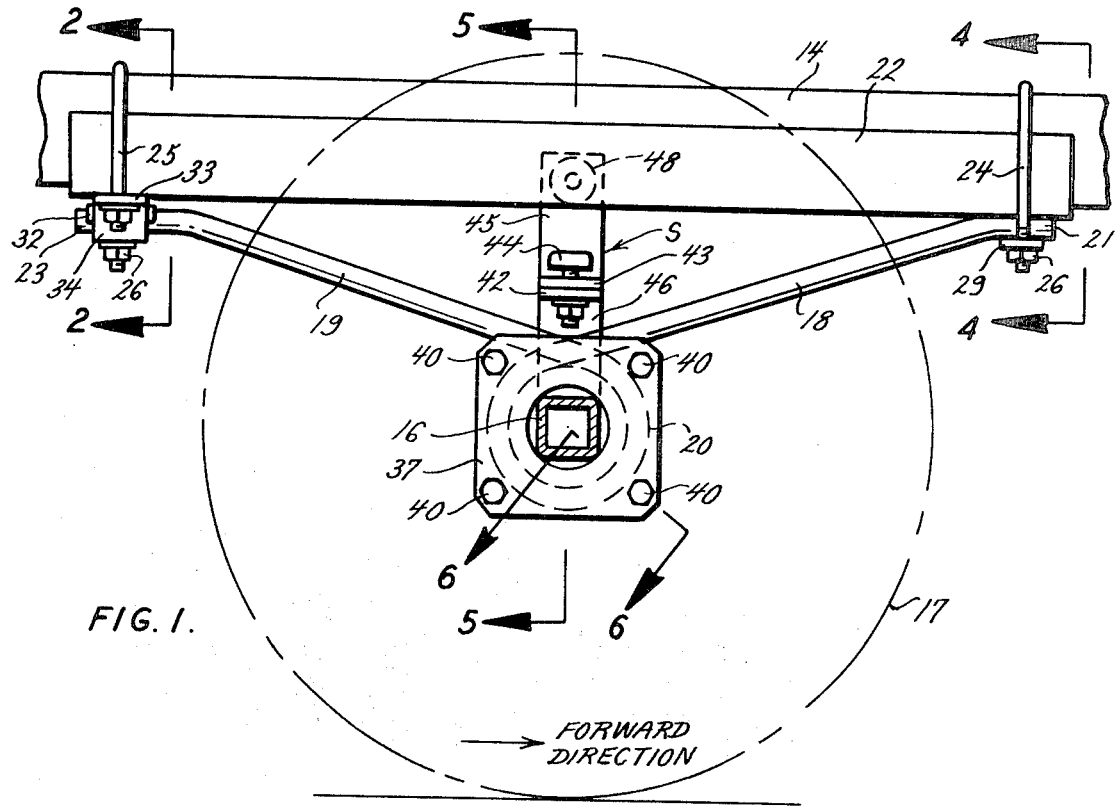
FIG. 1.
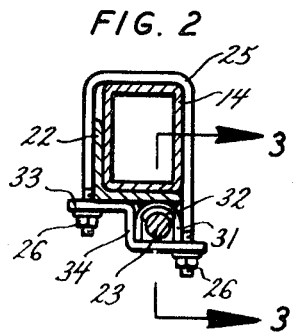
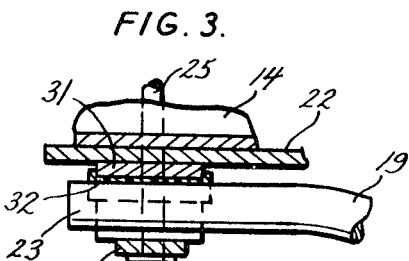
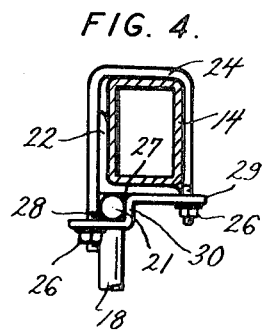
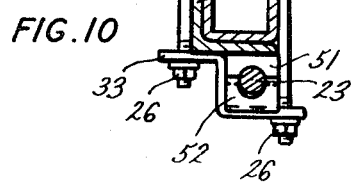
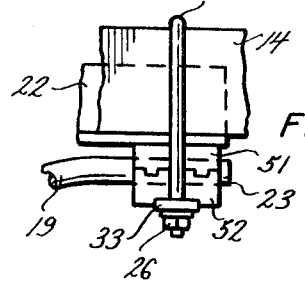
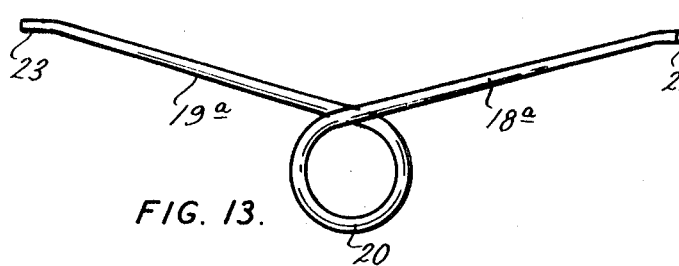
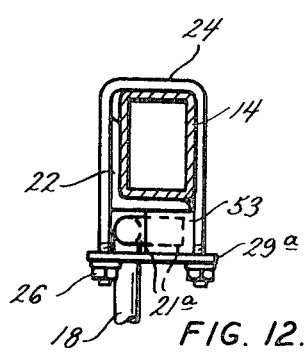

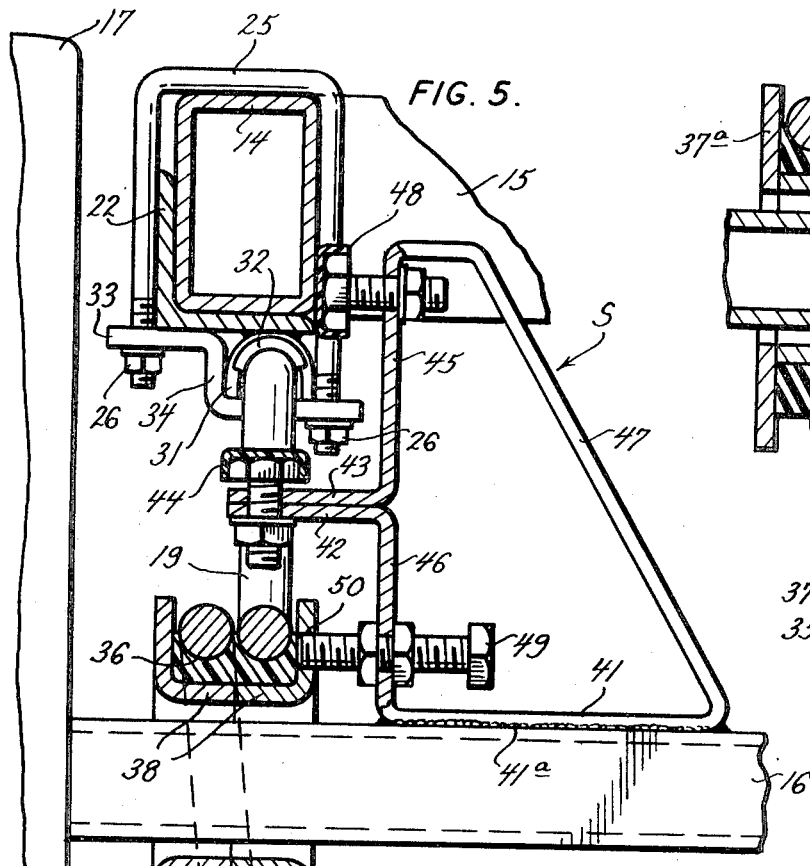
FIG. 5.
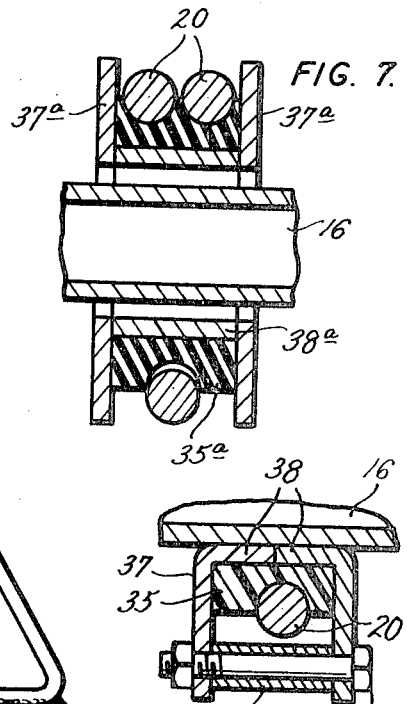
FIG. 7.
FIG. 6.
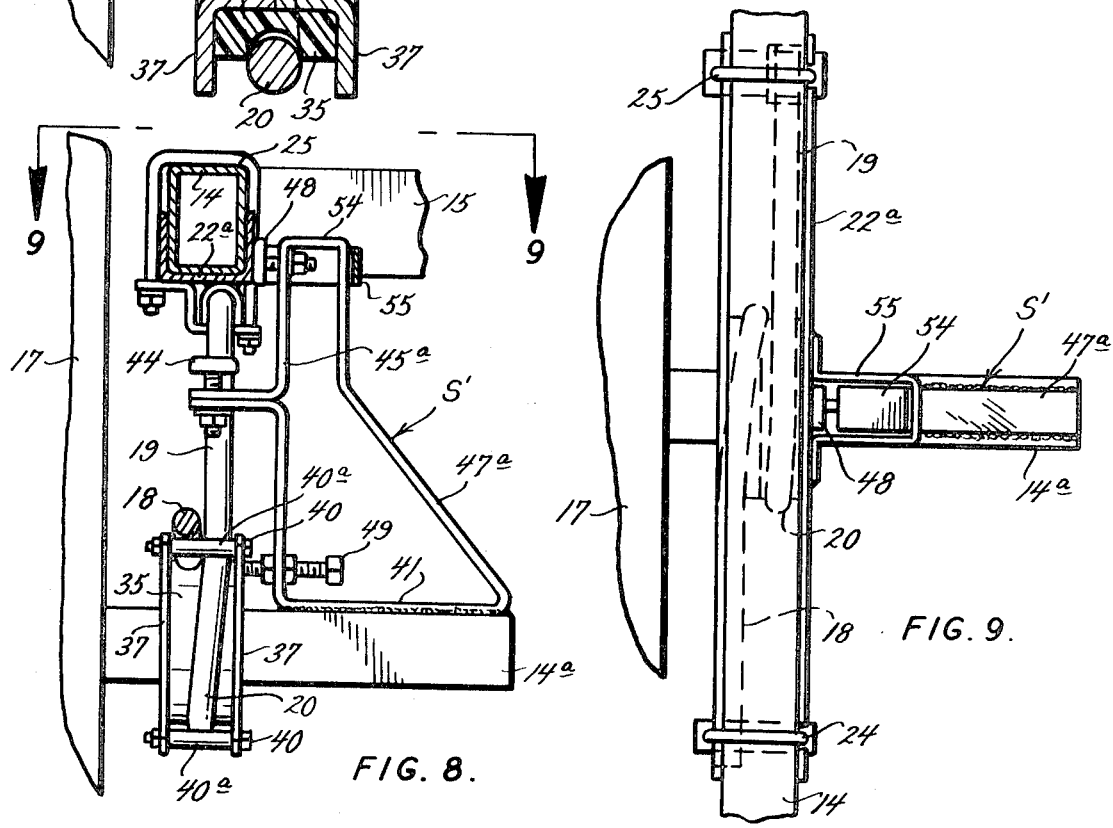
FIG. 8.
FIG. 9.

VEHICLE TORSION SPRING SUSPENSION ASSEMBLY

BRIEF SUMMARY OF THE INVENTION

The present invention is related to vehicle suspension assemblies and is particularly concerned with improvements in the suspension of trailer type vehicles in which torsion springs are incorporated.

Due to the many varieties of suspension applications for load carrying vehicles it is not always possible to obtain even stress levels throughout the suspension springs. Thus, the usual spring installations fail to obtain the optimum stored energy per pound of spring material and it has heretofore been the practice to design springs for the higher stress levels with consequent waste of spring material.

In this improvement for torsion type springs the rate and load carrying capacity will depend on the spring bar diameter, coil diameter, number of coils and length of the moment arms, and the bushing. While conventional calculations can be employed, the improved concept is embodied in the application of a bushing within the spring coil whereby substantially even stress levels may be obtained in the coil section and in the moment arm sections in a vehicle suspension geometry. Normally, the arm section has the lower stress level for a given load, but by varying the material, the hardness, and configuration of the bushing the rate and load carrying capacity of the coil section can be varied without increasing the stress. Hence, the load carried by the cantilever sections can be increased until substantially the same stress levels in the cantilever sections as exists in the combination of bushing and coil section of the spring. Furthermore, when the arm sections of the spring are tapered it reduces the weight of the spring material and assures substantially uniform stress in the cantilever sections.

BRIEF DESCRIPTION OF THE DRAWINGS

Preferred embodiments of this invention are shown in the accompanying drawings, wherein:

FIG. 1 is a fragmentary elevational view of a portion of a vehicle frame, axle and wheel incorporating a torsion spring suspension assembly of this invention;

FIG. 2 is a fragmentary transverse sectional view taken at line 2—2 in FIG. 1 to illustrate a mounting between one cantilever arm section of the torsion spring and the vehicle frame;

FIG. 3 is a further fragmentary sectional view of the mounting seen at line 3—3 in FIG. 2;

FIG. 4 is a fragmentary transverse sectional view taken at line 4—4 in FIG. 1 to illustrate a mounting between the opposite cantilever arm section of the torsion spring and the vehicle frame;

FIG. 5 is an enlarged fragmentary sectional view taken at line 5—5 in FIG. 1 to illustrate the torsion spring assembly between the vehicle frame and axle adjacent one wheel;

FIG. 6 is a fragmentary sectional view of the coil spring section and bushing, the section being taken at line 6—6 in FIG. 1;

FIG. 7 is a further fragmentary sectional view of the coil spring section and bushing assembly illustrating a modification of this invention;

FIG. 8 is a fragmentary sectional view of a further modification of the assembly of torsion spring and stub axle at one side of a vehicle frame;

FIG. 9 is a fragmentary top plan view of the assembly seen at line 9—9 in FIG. 8;

FIG. 10 is a fragmentary sectional view of a modified cantilever arm attachment to the vehicle frame;

FIG. 11 is a side elevational view of the attachment seen in FIG. 10 at line 11—11;

FIG. 12 is a further fragmentary sectional view of another modification; and

FIG. 13 is a view of a torsion spring having tapered cantilever arms.

DESCRIPTION OF THE ASSEMBLY

The present torsion spring assembly for suspension of a load carrying frame is best seen in FIGS. 1 and 5. The frame of the vehicle may have several general forms, but in the average case there are provided longitudinal side members, one of which is shown in sections at 14, and the side members are connected by a plurality of transverse or cross members, one of which is indicated at 15. It is to be understood that the frame is generally symmetrical so that the following description which will relate to one of the longitudinal side members need not present the opposite side member as it will be the mirror image.

The vehicle is provided with a suitable axle 16 having a conventional spindle (not shown) for mounting the ground engaging wheel and tire assembly 17. The axle may be of square tubular form for strength without excessive weight. The suspension assembly now to be described is connected between the axle 16 and each of the longitudinal frame members 14 at a location therealong that will generally balance the intended load in a horizontal attitude.

The suspension assembly includes a suspension spring of torsion type having oppositely directed cantilever arms 18 and 19 and a body coil 20 circumscribing the axle 16. The end portion 21 of the cantilever arm 18 is connected to the forward end portion of a mounting member in the form of an elongated angle 22 which provides a seat for the side frame member 14. The end portion 23 of the cantilever arm 19 is connected to the rearward end portion of the mounting member 22. The mounting member 22 is positioned with its horizontal leg under the side frame member 14 and its vertical leg extending upwardly at the outside face of the side frame member 14 as can be seen in FIG. 5. Suitable U-bolts or clamping shackles 24 and 25 at the respective ends of the mounting member serve to connect the mounting member to the side frame member. When mounted in this manner the mounting member 22 may be moved longitudinally of the frame member 14 to establish adjustments for load distribution. When adjusted as desired, the shackle nuts 26 are tightened to fix the frame 14 in its seat.

The forward end portion 21 (FIGS. 1 and 4) of the suspension spring arm 18 is secured by welding at 27 and at 28 to the shackle clamping plate 29. The clamping plate 29 is stepped at 30 to accommodate the end portion 21 of the spring arm 18, the step 30 being located adjacent the outside margin of the mounting member 22. The rearward end portion 23 of the spring arm 19 (FIGS. 1, 2 and 3) is mounted for longitudinal sliding movement in a U-shaped channel bearing element 31 which is secured to the mounting member 22 by welding and is provided with a noise suppressing liner 32 in contact on the spring arm end portion 23. A clamping plate 33 engages the ends of the U-bolt 25 and has a step 34 therein to accommodate the end portion 23 and to secure the mounting member 22 to the frame. In this manner the spring end portion 23 may slide longitudinally to compensate for the yielding action of the spring in response to relative vertical movement of the axle 16 and frame 14. The fixing of the forward arm portion 21 maintains the axle 16 in proper position so it may not move rearwardly relative to the frame 14 when traversing a rough ground surface or upon the wheel 17 striking a chuck hole or raised object.

The coil body 20 (FIGS. 1 and 5) in the present embodiment has one complete coil with the respective arms 18 and 19 extending therefrom in laterally offset relation (see FIG. 9). The offset positions of spring arms 18 and 19 necessitates that the clamping plates 29 and 33 should be oriented with the stepped portions 30 and 34 opposite to each other as shown in FIGS. 4 and 2 respectively. The spring coil 20 is seated in a bushing 35 (FIG. 5) having a matching spiral seat groove 36 formed in its periphery, and the bushing may be secured between a pair of mounting plates 37. Each plate 37 is formed with an inwardly turned eye 38 which abuts under the bushing 35 and receives the axle 16. The flanges of the mounting plates are interconnected by suitable bolts 40 (FIGS. 1 and 6) to secure the bushing 35 and spring coil body in operative assembly.

Lateral stability between the frame 14 and the wheel 17 is obtained by a stabilizer member S which has its base 41 secured to the axle 16 by welding at 41a. The stabilizer member S may be formed from strip material having its opposite ends bent outwardly at 42 and 43 to be in overlying abutment and projecting into the space between the coil body 20 and the frame member 14. An adjustable, vertical motion, strike out bumper element 44 is carried by the ends 42 and 43. The stabilizer S is formed with vertical arms 45 and 46 and a bracing arm 47 extending angularly upwardly from the base 41 to the top of the arm 45, and the arm 45 supports the adjustable stop element 48 which limits lateral movement by the head thereof engaging the side of the frame member 14. The head of elements 44 and 48 are covered with a noise isolator coating of suitable molded plastic material. The lower arm portion 46 of the stabilizer S carries an adjustable positioner element 49 with its outwardly extending end received in an aperture 50 in the flange of the adjacent mounting plate 37. Since there are a pair of stabilizers S, one adjacent each end of the axle 16, the frame 14 is prevented from excessive lateral sway. The adjustment elements 48 and 49 are particularly important due to wide variations in manufacturing tolerances from frame to frame.

As may be seen more in detail in FIGS. 5 and 6 the mounting plates 37 are held in spaced relation by distance elements 40a through which the bolts 40 extend. The spring body coil bushing 35 positioned between the plates 37 and surrounding the plate eyes 38 is formed of hard rubber or other suitable materials, such as nylon, Nylafil, polyurethane, or the like, which may be molded to provide the seat 36 for the body coil 20. The bushing is backed up by the axial eyes 38 on the mounting plates so that the yield of the bushing can be controlled through its hardness and the radial depth of the bushing body. In FIG. 7, the spring body coil 20 is mounted in the bushing 35a that is secured between a pair of flat plates 37a and the plates adjacent the axle 16 are spaced apart by a bushing back-up sleeve 38a. In this modified arrangement, the sleeve 38a acts in the same manner as the axial extending eyes 38 of the mounting plates 37 in FIG. 6.

While the coil section 20 of the suspension spring is seen with its bushing 35 captured by side plates 37 or 37a, it is contemplated that the side plates may be eliminated when the bushing is formed of material that has self-supporting characteristics, such as a sufficient hardness quality. In such situations, the adjustable element 49 in the stabilizer S may have an enlarged end (not shown) so as not to cut into the bushing, or the element 49 can be removed and the arm 46 on the stabilizer can be repositioned so as to be engaged by the inner side of the bushing. These alternate arrangements do not need to be shown as each is believed easily understood.

The spring body coil bushing 35 serves certain important functions. It acts as a noise isolator for road induced noise. It also acts to aid in controlling the spring rate so that the suspension spring may be evenly stressed. Because of the wide variety of commercial applications the suspension assembly cannot always be designed to obtain even stress levels throughout the spring, and this prevents reaching the ultimate stored energy per pound of spring. So this feature may be more easily understood, the spring of FIG. 1 can be thought of as having a cantilever arm section 18 or 19, and a body coil section 20. The physical formation of the arm section and the coil section results in mechanically different characteristics, and the sections therefore do not have the same stress levels when constituting parts of a single spring. This is not a desirable condition and can result in breakage at some place where the stress concentrates, usually in the zone adjacent the joining of the two sections. To avoid breakage the spring must be designed based on the section which has the higher stress level due to load. Therefore, the load carrying capacity of the spring section with the lower stress level for the same load will not be used to its full capacity, and some spring material is wasted. Avoidance of material waste can be achieved by tapering the arm sections of the spring as is shown in FIG. 13.

In general, the arm section 18 or 19 of the spring (FIG. 1) has a lower stress level than the body coil section 20 for a given load. For example, the stress in the arm section of 150,000 pounds per inch can be expected to carry a load of 1,000 pounds, but the coil section for the same stress of 150,000 pounds per inch can carry a load of only 750 pounds. Thus, the stress in the coil section for a 1,000 pound load will be greater than in the arm section. However, by combining a bushing 35 with the coil section 20, the coil section stress can be controlled to the extent that it will be substantially the same as for the arm section. Now, the spring can be substantially evenly stressed throughout and the breakage hazard is avoided. The hardness and configuration of the bushing 35 can be varied so that the rate of the coil section can be controlled to obtain even stress levels with the arm section. However, as can be seen in FIG. 13, the spring can be formed with outwardly tapering arm sections 18A and 19A for the body coil section 20, in which case the stress in the arms is substantially constant and of about the same stress level as in the coil section 20 with the bushing 35 in position.

As is shown in FIGS. 1, 2, 3, and 4, the spring arms 18 and 19 are operatively attached to a mounting member 22 which is adjustably connected to the vehicle frame by U-bolts 24 and 25 associated with the respective spring arm end portions 21 and 23. The arm end portion 21 is fixed against movement relative to the mounting member 22 while the end portion 23 is allowed to slide. Fixing the end portion 21 retains the axle 16 against longitudinal movement relative to the vehicle frame 14, while allowing sliding displacement of the end portion 23 compensates for the increase and decrease of length of the spring caused by vertical deflection due to load.

The views of FIGS. 10 and 11 illustrate a modified mounting of the spring arm end portion 23. Here the end portion 23 is slidably guided in and between a pair of interlocked blocks 51 and 52, held by the shackle plate 33 against the underside of mounting angle 22. The blocks 51 and 52 may be made of nylon, Nylafil, polyurethane, polyethylene, or other suitable material.

A further modification is seen in FIG. 12 wherein the spring arm 18 has its end portion formed with an angled portion 21a pivotally mounted in a block 53 held in position by the clamping plate 29a and the U-bolt 24. The axis of pivoting reaction of the arm end portion 21a is substantially perpendicular to the arm 18 so that the spring cannot move longitudinally but can move vertically without stressing the arm at or adjacent the end portion 21a. In FIG. 1, the arm end portion 21 is subjected to higher stress at the clamping plate 29.

FIGS. 8 and 9 illustrate a modified assembly, but wherever the parts are the same as before, like reference characters will be used to point them out. The important difference is that the assembly is associated with a stub axle 14a for the wheel assembly 17. This calls for a modified stabilizer S' in which the brace arm 47a and arm 45a are extended upwardly to form an extension end portion 54 that is vertically slidable in a guide bracket 55 fixed to the mounting member 22a. In view of the short axle 14a the moment on the axle 14a produced by the force at the wheel 17 will be balanced at the stabilizer S' by the extension 54 in the bracket 55.

In FIGS. 8 and 9 the mounting member 22a is a channel instead of the angle 22 of FIG. 5, so there will be a structural surface to use for the guide bracket 55, whereby as the channel 22a is slid along the frame 14 there will be no disturbance in the installation of the stabilizer or the resilient spring. Also, by selecting an appropriate length for the reach of the stabilizer extension 54 the horizontal load on the bracket 55 will be less than the load force on the wheel 17 tending to displace the wheel from its normal vertical position.

The drawings show several forms which this invention may take, but it is clear that the assembly may be adapted to a great many uses of commercial scope, and it is not intended to limit it to automobiles, as well as other wheeled vehicles having the torsion spring means herein described interposed between the axle and the frame. A single axle vehicle has been shown only for convenience, and a torsion spring having only a single turn for the coil body section has been described. It is understood that the number of coils and the length of the cantilever arms will depend upon the load carrying requirements of the vehicle. An advantage of the assembly is that the spring-axle-wheel combination may be bodily shifted relative to the frame to obtain the optimum condition of load distribution and balance about the single axle.

What is claimed is:

1. In an axle mounted torsion spring assembly, in combination, an axle member, a torsion spring having a body coil section encircling said axle and at least one cantilever arm section projecting from said body coil section and being directed substantially normal to said axle, said arm section being normally subject to load stress at a level lower than the stress in said body coil section, and means seated on said axle and engaged in said body coil section comprising a bushing body insulating said body coil section from said axle by being seated within said body coil section and being variably yieldable to body coil load reaction with load on said cantilever arm section, said bushing body being formed of a yieldable material to control the rate of said torsion spring such that the stress in said arm section and body coil section is substantially equal.

2. The torsion spring of claim 1 wherein said cantilever arm section is tapered outwardly from said coil section, and the stress level throughout the length of said tapered arm section is substantially constant.

3. The torsion spring of claim 1 and including means seated within said bushing body to vary the yielding characteristic of said bushing body.

4. The torsion spring assembly of claim 3 wherein said means seated within said bushing body is relatively unyieldable.

5. In an axle to frame suspension assembly for vehicles, a torsion spring having a body coil section and arm sections extending therefrom in opposite directions, bushing means engaged between said body coil and the vehicle axle, means connecting said arm sections to the vehicle frame, said means mounting the end portion of one arm section against longitudinal displacement relative to the frame and mounting the end portion of the other arm section for longitudinal movement relative to the frame, and stabilizer means between said vehicle axle and frame to limit lateral motion of the vehicle frame relative to the axle including means carried by said stabilizer means to adjust the limit of lateral motion of the vehicle frame relative to the axle.

6. In an axle to frame suspension assembly for vehicles, a torsion spring having a body coil section and arm sections extending therefrom in opposite directions, bushing means engaged between said body coil and the vehicle axle, means connecting said arm sections to the vehicle frame, said means mounting the end portion of one arm section against longitudinal displacement relative to the frame and mounting the end portion of the other arm section for longitudinal movement relative to the frame, stabilizer means between said vehicle axle and frame to limit lateral motion of the vehicle frame relative to the axle, and including adjustable vertical motion strike-out means carried by said stabilizer means in position to engage the vehicle frame.

7. In an axle to frame suspension assembly for vehicles, a torsion spring having a body coil section and arm sections extending from the coil section in opposite directions, said body coil section having at least one complete coil, a bushing seated within said body coil section, said body coil and bushing engaging the axle, mounting means engaged on the vehicle frame, and means connecting the respective arm sections of said torsion spring to said mounting means, said connecting means for one of said arm sections fixing said one arm section against movement longitudinally of the vehicle frame and said connecting means for the other of said arm sections permitting longitudinal movement thereof relative to the vehicle frame, said mounting means being adjustable relative to the frame and said means connecting the respective arm sections to said mounting means serving to secure said mounting means to the vehicle frame in adjusted position.

8. In an axle to frame suspension assembly for vehicles, an axle provided with a supporting wheel, a resilient bushing mounted on said axle and formed with a seat in its periphery, a torsion spring having a body coil circumscribing said bushing and engaged in said peripheral seat, said spring also having cantilever arms extending forwardly and rearwardly from said axle mounted bushing, a vehicle frame member spaced above said axle, means connecting the end portions of said cantilever arms to said frame member to transfer the vehicle load thereto and to said body coil, whereby said body coil is reactive on said bushing to levels of load stress substantially of the order of the load stresses in said cantilever arms, and stabilizer means between said axle and frame to limit lateral motion of said frame and axle, said stabilizer means having an element thereon to adjust the limit of lateral motion.

* * * * *